Aug. 30, 1927.
L. L. SCOTT
GEAR PUMP
Filed Nov. 16, 1923
1,640,727
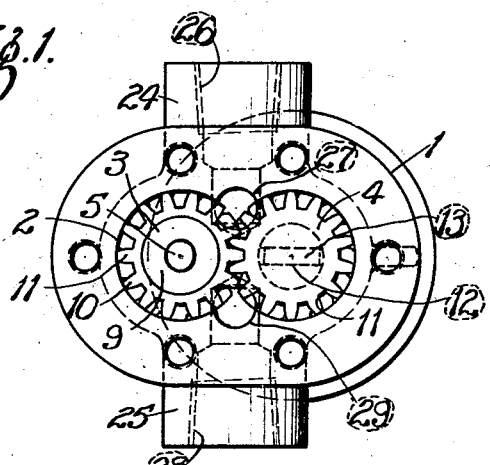
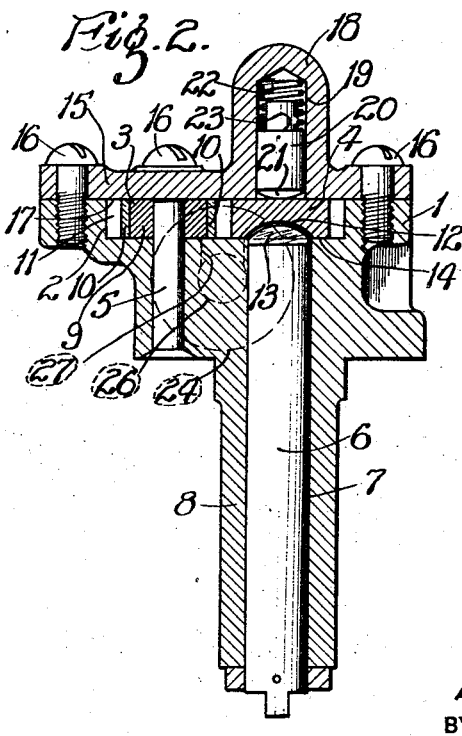
INVENTOR
LEWIS L. SCOTT
BY
ATTORNEY Patented Aug. 30, 1927.

1,640,727

UNITED STATES PATENT OFFICE.

LEWIS L. SCOTT, OF ST. LOUIS, MISSOURI, ASSIGNOR TO ELECTROL, INC. OF MISSOURI, OF ST. LOUIS, MISSOURI, A CORPORATION OF MISSOURI.

GEAR PUMP.

Application filed November 16, 1923. Serial No. 675,149.

This invention relates to a novel construction of spiral gear pumps or compressors and is designed particularly for use in domestic oil burning systems, although equally applicable to various other applications.

One of the special purposes designed to be subserved by the construction of my pump, is to render the same noiseless in operation, a desideratum of the greatest importance in the application of the pump to a domestic oil burner. Another leading purpose is to provide a pump or compressor of the character indicated, which, by its construction, will prevent all leakage of oil around the pump shaft.

With these purposes in view, the invention resides in the novel construction, arrangement and operation of parts hereinafter described.

In the accompanying drawing—

Figure 1 is a view in end elevation of the pump constructed according to my invention. the cover plate being removed to better illustrate the construction;

Figure 2 is a longitudinal sectional view of the same; and

Figure 3 is an edge view of one of the spiral gears.

Referring now to the drawings, the numeral 1 indicates the pump casing which is recessed in its end portion to provide a chamber 2 in which are seated two spiral gears 3, 4, respectively, in mesh with each other. The driven gear 3 is rotatably mounted on the end portion of a shaft 5 secured in the wall of the casing 1 and projecting upward into the chamber 2. The driving gear 4 is mounted in a manner to be hereinafter described on the end of the pump shaft 6 which has its bearing in a bore 7 provided in an extension 8 of the casing 1, and extending through the said casing into the chamber 2.

I secure the noiseless operation of my pump by using spiral gears and by constructing one of the gears of a material which will deaden the noise ordinarily produced by the frictional engagement of two hard metal gears running at a relatively high rate of speed. To this end, I preferably provide the central portion 9 of the gear 3 of hard metal, such as hardened steel, and secure thereon a ring 10 of a relatively soft material, such as fabric or aluminum, and having its periphery provided with spiral gear teeth 11. The ring 10 may be secured on the core 9 of the gear in any suitable manner, such as by being splined thereon, and preferably it is so secured as to be removable so as to permit the substitution of a new ring when the teeth of the old ring become worn.

I provide against leakage by a special way of mounting the gear 4 in connection with the pump shaft 6, and relative to a seat provided in the chamber 2, in such manner that an oil seal is provided which prevents leakage of oil around the pump shaft 6. To this end, the gear 4 is made of hard metal, such as hardened steel, and is provided on its side facing the end of the pump shaft 6 and in its longitudinal center, with a transverse groove 12 which is preferably circular in the direction of its depth. On the end of the pump shaft 6 I provide a shouldered extension 13 which is adapted to fit snugly but loosely in the groove 12. The bottom of the chamber 2 surrounding the bore 7 provides a flat seat 14 against which the flat side of the gear 4 seats, and the meeting surfaces are ground smooth so as to form a perfect seal against leakage of oil between the gear and the seat. The numeral 15 indicates a cover plate which is secured on the end of the casing 1 by means of screws 16, and provides a flat inner face 17 which bears against the outer faces of the gears 3 and 4. This cover plate is provided with an extension 18 in line with the barrel or extension 8 which affords a chamber 19. Mounted in this chamber is a plunger 20 having an inner rounded end portion 21 bearing against the outer face of the gear 4 and held in such contact by means of a coil spring 22 bearing at one end against a shoulder 23 provided on said plunger and at its upper end against the upper end of the chamber 19. By this arrangement, the gear 4 is maintained in firm frictional engagement with the seat 14 so as, at all times, to preserve the seal between said gear and said seat. At the same time, the rounded end 21 of the plunger presents the minimum of frictional resistance to the rotation of said gear.

The loose connection, described, between the gear 4 and the pump shaft 6 insures that the bearing for the gear shall always be on the seat 14 and the movement of the shaft, or any slight end thrusts thereof toward the gear, will not have any tendency to lift the gear from its seat as the tongue and groove connection between the shaft and gear provides the necessary amount of play to permit of movement of the shaft relative to the gear. However, I prefer to provide means for preventing any possibility of the gear 4 being unseated by inward movement of the shaft 6. To this end, I secure on the outer end of the shaft a collar $6^a$, which is positioned to bear against the end of the barrel 8 and thus prevent inward movement, or end thrust, of the shaft beyond a predetermined point determined by the position of the collar on the shaft. The casing 1 is provided with lateral extensions 24 and 25, the former having an inlet passage 26 for oil communicating with a port 27 leading into the chamber 2, and the latter having an outlet passage 28 communicating with an outlet port 29 from said chamber.

By the use of spiral gears in place of spur gears, I not only thereby aid in decreasing the noise of operation, but I likewise greatly increase the effective pressure capacity of the pump. The use of spiral gears, therefore, is a characteristic of my pump; but the manner of seating and driving the driving gear and the use of a driven gear having a hard metal core with a ring containing gear teeth constructed of relatively soft material could, of course, be utilized in connection with spur gears equally as well as with spiral gears, which I prefer to employ.

The operation of the pump, except in the particulars noted, does not differ from that of an ordinary gear pump, and no description thereof is deemed necessary.

It will be understood that the pump as herein shown and described, represents an illustrative embodiment of my invention, and that so far as the broad principle of the invention is concerned, other embodiments thereof, involving changes in the form, arrangement and construction over the pump as herein illustrated, could be produced without departing from the spirit of the invention.

I claim:

1. A gear pump comprising a casing having a chamber affording a seat, a driving and a driven gear housed in said casing, the driving gear having one of its sides forming a sealing engagement with said seat, means for maintaining said driving gear in such engagement, and a pump shaft having a bearing in said casing and a loose connection at one end with said driving gear.

2. A gear pump comprising a casing having a chamber affording a seat, a driving and a driven gear housed in said casing, said driving gear having one of its sides forming a sealing engagement with said seat, means for exerting yielding pressure on said driving gear to hold it in engagement with its seat, and a pump shaft having a bearing in said casing and a loose connection at one end with said driving gear.

3. A gear pump comprising a casing having a chamber affording a seat, a driving and a driven gear housed in said chamber, the driving gear having one of its sides forming a sealing engagement with said seat and provided on its other side with a transverse groove, a pump shaft having a bearing in said casing and provided at one end with a tongue loosely engaged in said groove, and a spring pressed plunger normally exerting pressure against the other side of said driving gear to maintain the seating side of said gear in firm engagement with its seat.

4. A rotary pump comprising a casing, a rotary member housed therein, a shaft having a bearing in said casing and operatively connected to said member, the latter and the shaft being relatively movable, and means for effecting a sealing engagement between one of said relatively movable parts and the wall of said casing around said shaft.

5. A rotary pump comprising a casing affording a bearing surrounded by a seat, a rotary member housed in said casing, a shaft mounted in said bearing and operatively connected with said rotary member, the latter and said shaft being movable relative to each other, and means for maintaining said rotary member in sealing contact with said seat to provide a seal around said shaft.

6. A rotary pump comprising a casing affording a seat, operating parts comprising a rotary member housed in said casing and a shaft having a bearing in said casing and connected with said rotary member to drive the same, means for continuously forcing one of said parts against said seat for effecting a seal on said seat around said shaft, and means for preventing inward movement of said shaft tending to move said part from said seat.

7. A rotary pump comprising, a casing, an element rotatable in said casing, a shaft having a loose driving connection with said element, and means for holding said element against the shaft end of said casing.

8. A rotary pump comprising, a casing, an element rotatable in said casing, a shaft, means for holding said element against the shaft end of said casing, and a driving connection between said shaft and said element adapted to permit free seating of said element.

9. A rotary pump comprising, a casing, an element rotatable in said casing, a shaft having a loose driving connection with said element, means for holding said shaft, and means for seating said element against the shaft end of said casing.

10. A rotary pump comprising, a casing, a shaft having a bearing in said casing, a rotatable element adapted to seat against the shaft bearing and having a loose driving connection with said shaft, and means for holding said element against its seat.

11. A rotary pump comprising, a casing, a shaft, a rotatable element adapted to seat against the shaft end of said casing and having a loose driving connection with said shaft, and means for yieldingly holding said element against its seat.

In testimony whereof, I have hereunto set my hand.

LEWIS L. SCOTT.